(12) United States Patent
Buch

(10) Patent No.: US 6,191,906 B1
(45) Date of Patent: Feb. 20, 2001

(54) METHOD FOR ESTIMATING SAMPLING PHASE FROM SYNCHRONOUSLY DEMODULATED SAMPLES OF SINUSOIDAL WAVEFORMS

(75) Inventor: Bruce D. Buch, Westboro, MA (US)

(73) Assignee: Quantum Corp., Milpitas, CA (US)

( * ) Notice: Under 35 U.S.C. 154(b), the term of this patent shall be extended for 0 days.

(21) Appl. No.: 09/306,233

(22) Filed: May 6, 1999

(51) Int. Cl.$^7$ ........................................... G11B 5/09
(52) U.S. Cl. .................................. 360/51; 360/46
(58) Field of Search ........................... 360/51, 46

(56) References Cited

U.S. PATENT DOCUMENTS 5,341,249   8/1994   Abbott et al. .................... 360/46

Primary Examiner—Thang V. Tran
Assistant Examiner—Regina Y. Neal
(74) Attorney, Agent, or Firm—Micah Stolowitz

(57) ABSTRACT

A timing error extractor (166) determines the phase angle between an input signal and a sampling clock by computing arctan(v/u)=arctan(alog(log(v)−log(u))), where (v) and (u) are the respective quadrature amplitudes of the input signal and sampling clock. The log function values are stored in a first lookup table (180) that is time-shared by a switching function (182) to provide both log(v) and log(u) values. A storage element (184) holds the log(u) value while the switching function routes magnitude (v) to the first lookup table. The resulting log(v) value and the stored log(u) are combined in a subtraction function (186) that generates log(v)−log(u), which result addresses a second lookup table (188) that returns the addressed arctan(alog(log(v)−log(u))) value. This phase estimating approach is advantageous because it is gain insensitive, does not include a costly and time-consuming divide operation, and requires a relatively small lookup table.

13 Claims, 4 Drawing Sheets

METHOD FOR ESTIMATING SAMPLING PHASE FROM SYNCHRONOUSLY DEMODULATED SAMPLES OF SINUSOIDAL WAVEFORMS

RELATED APPLICATION(S)

Not applicable

FEDERALLY SPONSORED RESEARCH OR DEVELOPMENT

Not Applicable

TECHNICAL FIELD

This invention relates to disk drive data storage devices and more particularly to a high-speed phase estimating method for improving signal acquisition performance in a disk drive read channel.

BACKGROUND OF THE INVENTION

Conventional disk drives have employed peak detection techniques to recover digital data written as saturation recording onto a magnetizable surface media of a rotating disk. Using peak detection requires spacing flux transitions sufficiently apart so that analog peaks in the recovered data stream may be identified and the corresponding data recovered. To achieve reasonable bandwidths in data channels, it has been customary to employ data coding techniques, such as a (1,7) RLL code in which flux transitions are no closer together than every other clock bit time period ("bit cell") nor farther apart than eight clock bit cells. Such codes are referred to as "rate two-thirds" codes because two data bits are coded into three code bits. Thus, with a rate two-thirds code, one third of the user storage area of the storage disk is required for code overhead.

One way of decreasing the code overhead is to employ a code in which flux transitions are permitted in adjacent bit cells, such as a (0,4,4) code, which is referred to as a rate eight-ninths code in which nine code bits are required for eight incoming data bits. Using such a code significantly increases the disk data storage capacity, but causes flux transitions to occur in adjacent bit cells, which results in intersymbol interference ("ISI"). Unfortunately, peak detection techniques are not effective or reliable in recovering data coded in an eight-ninths code format, such as (0,4,4).

However, partial response signaling enables improved handling of ISI and allows more efficient use of a given channel bandwidth. Because the nature of ISI is known in these systems, it may be taken into account in the decoding/detection process. Partial response data transmission lends itself to synchronous sampling and provides an elegant compromise between error probability and the available spectrum. Partial response systems include duobinary, dicode, and class IV (or "PR4") systems. The PR4 system emphasizes midband frequencies and results in a read channel having increased noise immunity and reduced distortion at both low and high frequencies. In magnetic recording PR4 is a preferred partial response system because its response spectrum closely matches the natural characteristics of a magnetic data write/read channel.

Detecting user data from a stream of coded data requires shaping the channel to a desired partial response characteristic, such as the PR4 characteristic, and employing a maximum likelihood ("ML") sequence estimation technique. The maximum likelihood sequence estimation technique extracts the data by analyzing a number of consecutive data samples from the coded serial data stream, rather than sampling just one peak, as was done with prior peak detection methods.

One ML sequence estimation algorithm is the well-known Viterbi detection algorithm. Application of the Viterbi algorithm to PR4 data streams within a magnetic recording channel improves data detection performance in the presence of ISI and improves the signal-to-noise ratio over other peak detection techniques. Because the Viterbi algorithm operates on a sequence of discrete data samples, the read signal is necessarily filtered, sampled, and equalized.

Disk drive data capacity and performance has also been improved by employing techniques, such as zoned data recording, embedded servo sector-based head positioning, and thin-film heads. However, these improvements were somewhat incompatible with PR4,ML data detection techniques because the resulting coded serial data stream had rapidly varying gain, frequency, and phase that inhibited predictable signal sampling. Accordingly, prior workers have developed rapidly acting gain, frequency, and phase timing acquisition control loops within the PR4,ML data channel so that the phase of the sampling clock could be rapidly resynchronized following interruption by an embedded servo sector, or upon switching from one data zone to another. Disk drives employing such techniques are described in U.S. Pat. No. 5,341,249 for DISK DRIVE USING PMRL CLASS IV SAMPLING DATA DETECTION WITH DIGITAL ADAPTIVE EQUALIZATION, which is assigned to the assignee of this application and is incorporated herein by reference.

Unfortunately, as disk drive capacity and performance continues to increase, even the above-described acquisition control loops are being taxed to their limits. In addition to performance, disk drives are diminishing in size and cost. Accordingly, higher performance must be accompanied by simplification and cost reduction.

SUMMARY OF THE INVENTION

An object of this invention is, therefore, to provide a very high performance data acquisition control loop.

Another object of this invention is to simplify existing disk drive control loops while improving their performance.

A further object of this invention is to provide a method of estimating the phase angle between two signals.

A multi-mode timing loop of this invention combines an analog-based timing loop and a digital timing loop for timing data samples taken by a flash analog-to-digital A/D converter. During a non-read mode, timing is controlled by the analog based timing loop, and during read mode, timing is controlled by the digital timing control circuit. During non-read mode, a frequency synthesizer generates predetermined frequencies approximately corresponding to expected disk drive data rates. The synthesizer also generates a clock signal that enters a phase detector for comparison with the flash A/D converter sampling clock signal provided by a current-controlled oscillator.

Read mode is entered whenever user data is read from the disk surface. The beginning of every recorded data segment has a data header that includes a constant frequency preamble pattern that is used to initialize gain settings, preset the timing loop to an approximate starting phase, and synchronize the sampling clock in preparation for sampling subsequent user data. When the preamble pattern is first detected, a timing acquisition mode is entered, during which the flash A/D converter samples the incoming waveform at approximate locations. During the timing acquisition mode, the digital timing loop is in control, which has various components including a timing error extractor. Data samples are conveyed from the flash A/D converter to the timing error extractor, which generates sampling phase estimates for approximately phase locking the loop until adaptive components in the loop can settle.

The timing error extractor preferably employs a phase estimating approach that determines the phase angle between the sampled input signal and the sampling clock by computing arctan(v/u)=arctan(alog(log(v)−log(u)), where (v) and (u) are the respective quadrature amplitudes of the input signal and the sampling clock. The log function values are stored in a first lookup table that is time-shared by a switching function to provide both the log(v) and log(u) values. A storage element holds the log(u) value while the switching function routes magnitude v to the first lookup table.

The resulting log(v) value and the stored log(u) are combined in a subtraction function that generates log(v)−log(u), which result addresses a second lookup table that returns the addressed arctan(alog(log(v)−log(u))) value.

The phase estimating approach of this invention is advantageous because it is insensitive to gain, does not include a costly and time-consuming divide operation, and does not require an unduly large lookup table. Such an approach may be readily implemented in an application specific integrated circuit.

Additional objects and advantages of this invention will be apparent from the following detailed description of a preferred embodiment thereof that proceeds with reference to the accompanying drawings.

DETAILED DESCRIPTION OF A PREFERRED EMBODIMENT

Figure 1:
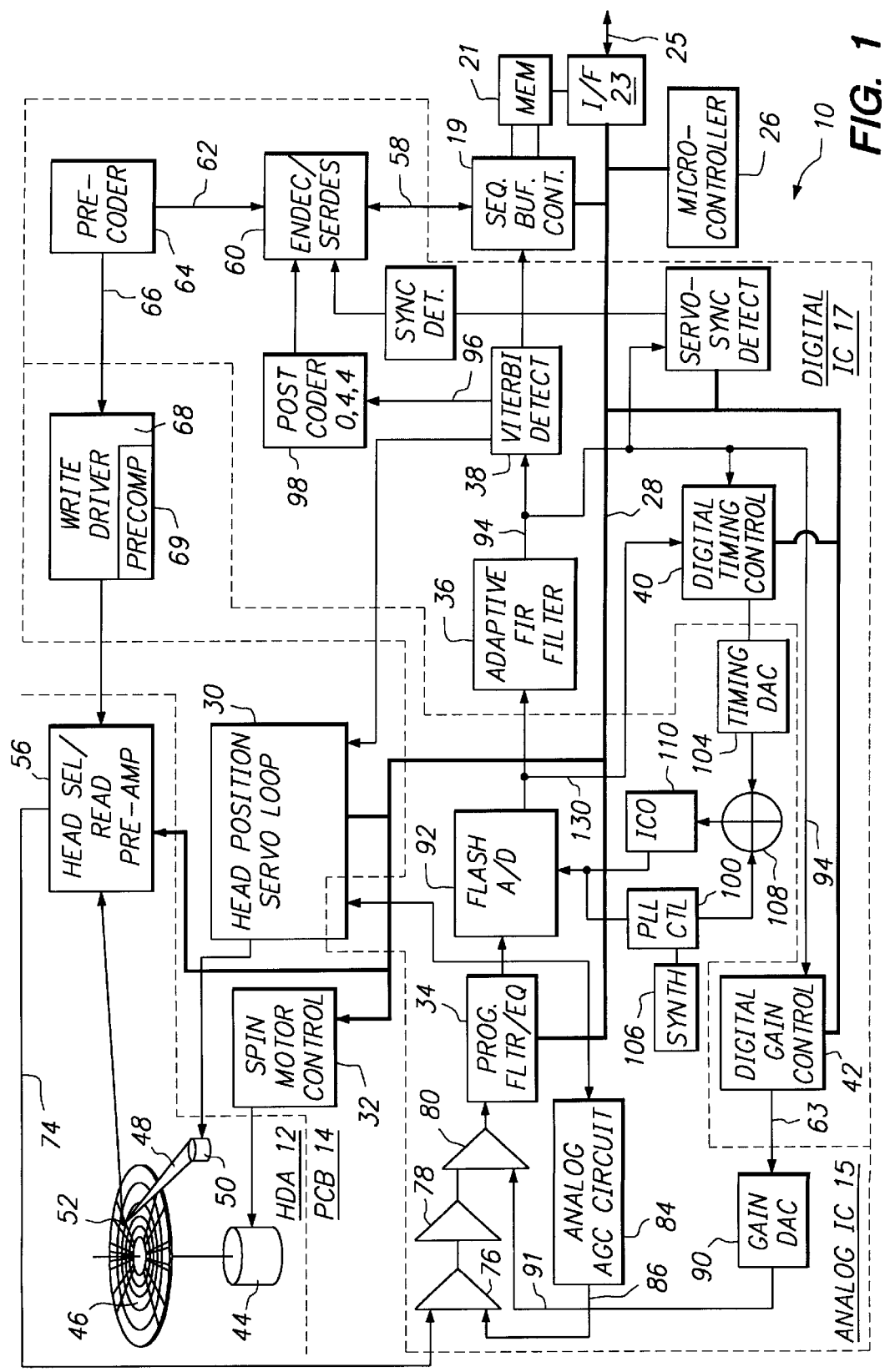
FIG. 1 is a simplified overall system block diagram of a disk drive including a PR4, ML write/read channel architecture incorporating principles and aspects of this invention.

FIG. 1 shows an example of a high performance, high data capacity, low cost disk drive 10 that is suitable for use with this invention. Disk drive 10 includes a PR4,ML write/read channel, a head and disk assembly ("HDA") 12, and at least one electronics circuit board ("PCB") 14. HDA 12 may follow a wide variety of embodiments and sizes, such as ones described in U.S. Pat. Nos. 5,027,241; 4,669,004; and 5,084,791, which are assigned to the assignee of this application.

PCB 14 physically supports and electrically connects the circuitry for disk drive 10 and includes a PR4, ML read/write channel application-specific integrated circuit ("analog ASIC") 15, a PR4, ML read/write channel ("digital ASIC") 17, a data sequencer and cache buffer controller 19, a cache buffer memory 21, and an interface controller 23, such as a SCSI II interface for communicating over a bus 25. A micro-controller 26 communicates over a bus 28 for controlling sequencer 19, interface controller 23, a head position servo loop 30, a spindle motor controller 32, a programmable analog filter/equalizer 34, an adaptive FIR filter 36, a Viterbi detector 38, a digital timing control 40, and a digital gain control 42. Micro-controller 26 directly accesses cache buffer memory 21 via data sequencer and cache buffer controller 19 and may also include on-board and outboard read-only program memory.

PCB 14 also supports circuitry related to head positioner servo loop 30 including, e.g., a separate microprogrammed digital signal processor ("DSP") for controlling head position based upon detected actual head position data generated by a servo peak detection portion of the PR4,ML read channel and desired head position supplied by micro-controller 26. Spindle motor controller 32 controls disk spindle motor 44, which rotates disk or disks 46 at a desired angular velocity. A data transducer head stack assembly 48 is positioned by a rotary voice coil actuator 50 that is controlled by head position servo loop 30. As is conventional, each data transducer head 52 of head stack assembly 48 "flies" over a disk surface of each associated disk 46. Head stack assembly 48 thus positions thin film data transducer heads 52 relative to selected ones of a multiplicity of concentric data storage tracks 71 (FIG. 2) defined on each storage surface of disk 46. While thin film heads are presently preferred, further improvements in disk drive performance may be realized when other types of heads are employed in the PR4, ML data channel, such as MiG heads or magneto-resistive heads, for example.

Data transducer heads 52 are positioned in unison with each movement of rotary voice coil actuator 50, and the resulting vertically aligned, circular data track locations are frequently referred to as "cylinders" in the disk drive art. Disks 46 may be conventionally formed from aluminum alloy or glass disks that have been sputter-deposited with a suitable multi-layer magnetic thin film and a protective carbon overcoat. Other disks and magnetic media may be employed, including plated media and or spin-coated oxide media.

A head select/read channel preamplifier 56 is preferably included within HDA 12 in close proximity to heads 52 to reduce noise pickup. Preamplifier 56 is conventionally mounted to, and connected by, a thin flexible plastic printed circuit substrate, a portion of which extends from HDA 12 and electrically connects to PCB 14.

A bidirectional user data path 58 interconnects data sequencer and cache buffer controller 19 to an encoder/ decoder and serializer/deserializer ("ENDEC/SERDES") 60, which converts the binary digital byte data stream into coded data sequences in accordance with a predetermined data coding format, such as the (0,4,4) code. This coded serial data stream is then conveyed over a path 62 to a precoder 64 that precodes the data in accordance with the PR4 precoding algorithm. The precoded data are then conveyed over a path 66 to a write driver 68 within analog ASIC 15 wherein the precoded data are ISI precompensated by a write precompensation circuit 69 and conveyed via a head select function within preamplifier 56 to a selected data transducer head 52. The selected head 52 writes the data as a pattern of alternating flux transitions within a selected data track 71 (FIG. 2) of a block of data tracks 72 (FIG. 3) defined on a selected data storage surface of disk 46. Embedded servo patterns are written by a servo writer in accordance with well-known methods.

During data reading operations, flux transitions sensed by thin film data transducer head 52 are amplified by preamplifier 56 and conveyed as a "read signal" on a path 74 to analog ASIC 15 and through a first variable gain amplifier ("VGA") 76, a fixed gain amplifier 78, and a second VGA 80. After controlled amplification, the read signal is passed through programmable analog filter/equalizer 34. During data non-reading times, an analog automatic gain control circuit 84 conveys an error voltage to first VGA 76 over a control path 86, whereas during data read times, a digital gain control value from digital gain control circuit 42 is converted into an analog value by a gain DAC 90 and conveyed over a path 91 to control second VGA 80 while the analog error voltage on path 86 is held constant.

Programmable analog filter/equalizer 34 is programmed to optimally equalize data transferred at the data transfer rate of the selected data zone 70 (FIG. 2) from which data transducer head 52 is currently reading data. The equalized analog read signal is then subjected to sampling and quantization by a high speed flash analog-to-digital converter ("flash A/D") 92, which when synchronized to user data, generates raw data samples for filtering by FIR filter 36 and detection by Viterbi detector 38.

FIR filter 36 employs adaptive filter coefficients for filtering and conditioning the raw data samples accordance with the desired PR4 channel response characteristics. The bandpass filtered and conditioned data samples are then conveyed over a path 94 to Viterbi detector 38, which detects the data stream employing the Viterbi ML algorithm. The decoded data are conveyed in a (0,6,5) format on a path 96 to a postcoder 98 that receives the (0,6,5) coded data stream and restores the original (0,4,4) coding format to the decoded data. The restored data stream is decoded and deserialized by ENDEC/SERDES 60, which frames and produces 8-bit user data bytes that are conveyed over bidirectional data path 58 to data sequencer and cache buffer controller 19.

For accurate detection, the incoming analog signal waveform must be sampled at precisely predefined, uniformly spaced apart locations. Accordingly, a dual mode timing loop is provided to control the operating frequency and phase of samples taken by flash A/D 92. The timing loop includes an analog timing control circuit 100, digital timing control circuit 40, and a timing DAC 104. A timing phase locked synthesizer circuit 106 provides synthesized timing signals to analog timing control circuit 100, which provides a timing reference signal to a summing junction 108, which in turn provides a sum signal for controlling a current controlled oscillator ("ICO") 110 that times the sampling by flash A/D 92. ICO 110 includes zero phase start circuitry to provide controlled startup at an approximately correct phase with the incoming data samples. Fast acquisition of the actual phase is accomplished by a phase estimation technique of this invention that is described with reference to FIGS. 4 and 8.

Flash A/D 92 is also employed in setting read signal gain. A dual mode gain loop is provided that includes analog automatic gain control circuit 84, which controls first VGA 76, and digital gain control circuit 42 and gain DAC 90, which control second VGA 80.

Figure 2:
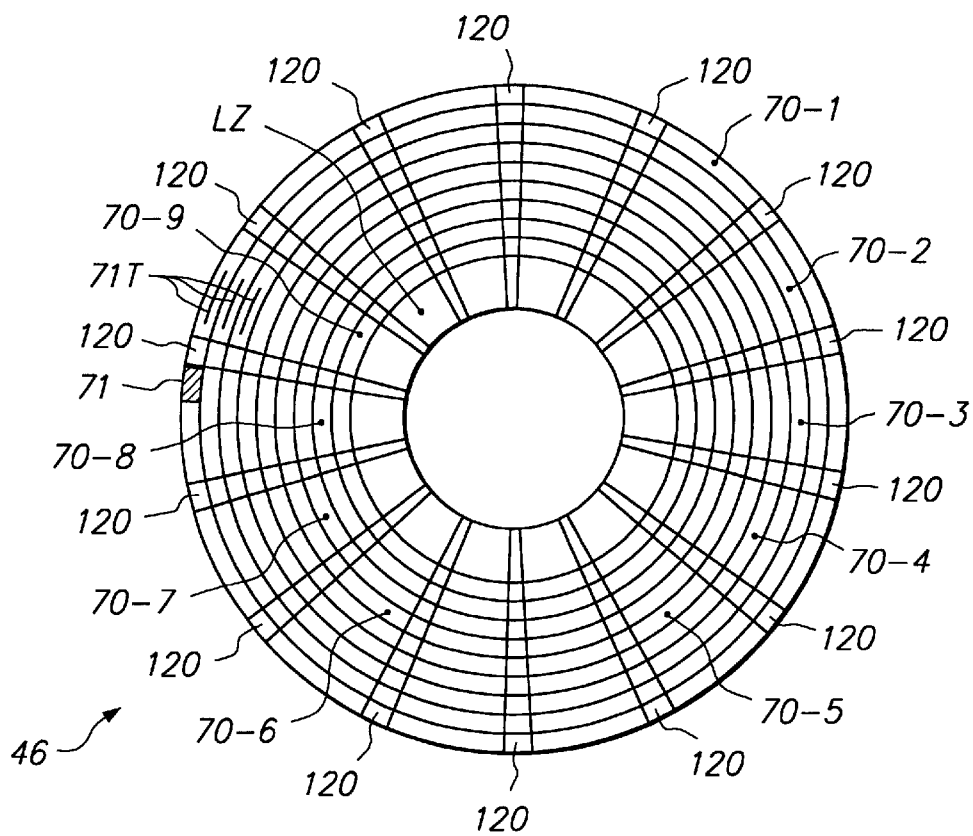
FIG. 2 is a simplified schematic plan view of a recording pattern formed on a data storage surface of the FIG. 1 disk drive, illustrating data zones and embedded servo sector patterns.
Figure 3:
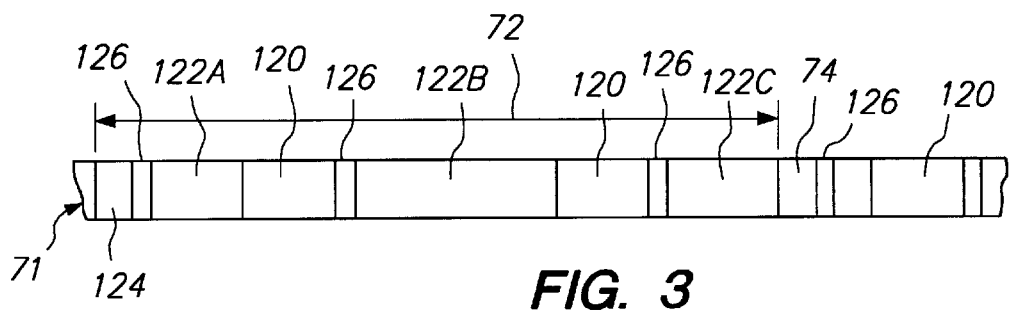
FIG. 3 is an enlarged lineal depiction of a segment of one data track within the multiplicity of data tracks defined within the FIG. 2 recording pattern, illustrating one data field that has been split into segments by regularly occurring embedded servo sectors.
Figure 3A:
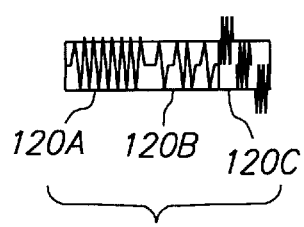
FIG. 3A is an enlarged diagrammatic representation of flux transitions comprising one of the embedded servo sectors of the FIG. 3 lineal data track segment depiction.
Figure 3B:
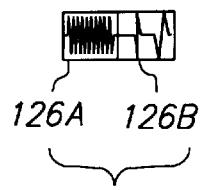
FIG. 3B is an enlarged diagrammatic representation of flux transitions comprising one of the data ID headers of the FIG. 3 lineal data track segment depiction.

Referring to FIG. 2, the need for fast phase acquisition of frequency and phase for controlling samples taken by flash AID 92 is made apparent by an understanding of an exemplary data storage surface of storage disk 46, which comprises a multiplicity of concentric data tracks 71, which are preferably arranged in a plurality of data recording zones 70 located between an inner landing zone area LZ and a radially outermost peripheral data track zone 70-1. Data tracks 71 are shown arranged into nine data zones including outermost zone 70-1, and radially inward zones 70-2, 70-3, 70-4, 70-5, 70-6, 70-7, 70-8, and 70-9, but in practice, more zones, such as 16 zones, are preferred. Each zone 70 has a bit transfer rate selected to optimize transition domain densities for the particular radius of the zone. Because the number of available magnetic storage domains varies directly as a function of disk radius, data tracks 71 in outermost zone 70-1 contain considerably more user data than can be contained in tracks 71 located in innermost zone 70-9. The number of data fields, and the data flux change rate remain the same within each data zone, and are selected as a function of radial displacement from the rotational axis of disk 46.

FIG. 2 also shows a series of radially extending embedded servo sectors 120 that are equally spaced around the circumference of the disk 46. As further revealed in FIG. 3, each servo sector 120 includes a servo preamble field 120A, a servo identification field 120B, and a field 120C of circumferentially staggered, radially offset, constant frequency servo bursts. Tracks 71 also include data fields 122 for storing user data and error correction codes, data block header fields 124, and data block ID fields 126.

While the number of data fields 122 per track 71 varies from data zone 70-1 to data zone 70-9, the number of servo sectors 120 per track 71 remains constant because they extend radially and are circumferentially equally spaced apart throughout the extent of the storage surface of the disk 46. Also, the information recorded in servo ID field 120B of each servo sector 120 is prerecorded during manufacture at a relatively low, constant frequency that can be reliably retrieved at the innermost track within the innermost zone 70-9. While regularly spaced apart servo sectors 120 are preferred, many other patterns are possible.

Each data field 122 has a fixed storage capacity or length (e.g. 512 bytes) and, the storage density and data rates vary from zone to zone. Accordingly, servo sectors 120 interrupt, and subdivide, at least some of data fields 122 into segments. Servo sectors 120 are preferably prerecorded at a single data cell rate and with phase coherency from track to track. Clearly, as disk 46 rotates, the read data frequency, phase, and amplitude will rapidly change as data transducer head 52 senses different tracks 71, zones 70, and servo sectors 120.

As stated earlier, in a sampled data system, such as PR4, ML, it is necessary to sample and quantize the incoming analog information with flash A/D 92 at predetermined sampling times. Properly timed sampling requires that ICO 110 cause flash A/D 92 to be properly synchronized and phase aligned with the incoming data stream. This invention employs a multi-mode timing loop to achieve rapid frequency and phase alignment with the incoming data to carry out correctly timed data sampling.

Referring again to FIG. 1, the multi-mode timing loop comprises the combination of an analog-based timing loop including analog timing control circuit 100, timing summing junction 108, and ICO 110, which controls sample timing of flash A/D 92; and a digital timing loop including digital timing control 40, timing DAC 104, summing junction 108, and ICO 110. Flash A/D 92 provides a common path for both timing loops. The multi-mode timing loop has a non-read mode and a data read mode. During the non-read mode, timing is controlled by the analog based timing loop, and during read mode, timing is controlled by the digital timing control circuit 40. Also during read mode, there are acquisition and tracking sub-modes. In the acquisition sub-mode, raw data samples are taken from the path 130 interconnecting flash A/D 92 and FIR filter 36. In the tracking sub-mode, conditioned data samples are taken from path 94 between FIR filter 36 and Viterbi detector 38. Non-read mode will be described first.

Figure 4:
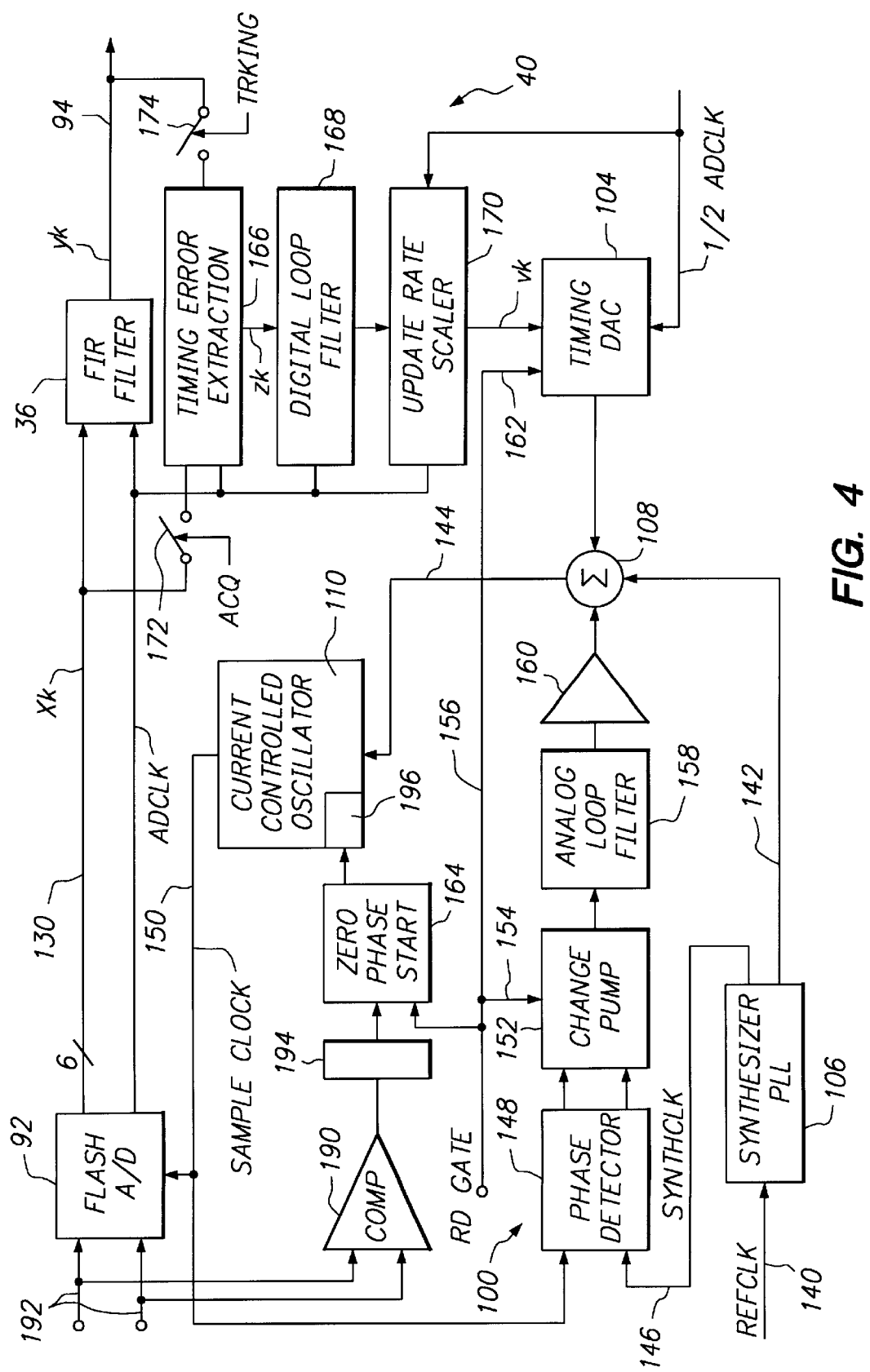
FIG. 4 is a functional block diagram of a multi-mode timing loop included in the disk drive architecture of FIG. 1.

Referring to FIG. 4, during non-read mode, frequency synthesizer 106 receives a reference clock frequency REFCLK over a path 140 from a clock, such as a crystal oscillator operating at a system clocking rate. Synthesizer 106 generates predetermined frequencies corresponding to the respective data rates of data zones 70-1 to 70-9, and produces a synthesizer current reference value over a path 142, through summing junction 108, and to ICO 110 over a path 144. (Timing DAC 104 in the digital timing loop is not enabled during non-read mode.) Synthesizer 106 also generates a synthesizer clock signal SYNTHCLK on a path 146, which signal enters a phase detector 148 for comparision with flash A/D 92 clock signal SAMPLECLK provided over a path 150 from ICO 110. Phase detector 148 generates a phase error signal that controls an analog charge pump 152, an output of which is enabled by a RDGATE signal 156 received on a path 154. Once enabled, the output of charge pump 152 drives a low-pass analog loop filter 158 that includes a charge storage device for accumulating and storing a timing error signal derived by charge pump 152. A transconductance amplifier 160 converts the timing error signal into a current that is applied to one input of summing junction 108.

When the timing loop is in the non-read mode, the RDGATE signal 156 is false, and enable signal 154 is true, thereby establishing a signal path between analog charge pump 152 and analog loop filter 158. Therefore, during the non-read mode, charge pump 152 charges up loop filter 158 while, at the same time, another enable 162 (also derived from RDGATE signal 156) inhibits timing DAC 104 so that the only signal developed by summing junction 108 is a sum of the signals received from synthesizer 106 on path 142 and the analog error signal from transconductance amplifier 160. The sum is conveyed over path 144 to ICO 110, which generates on path 150 a SAMPLE CLOCK signal for flash A/D 92 and phase detector 148. Operation of the analog timing loop phase locks an ADCLOCK signal to the SYNTHCLK signal. The ADCLOCK signal is generated by flash A/D 92 to indicate precisely when signal samples are taken.

Ordinarily, the timing loop remains in non-read mode unless or until user data is received from a disk surface. Read mode is entered whenever PR4,ML user data is to be read from the disk surface. At the beginning of every recorded data segment 122 (FIG.3), data header 126 includes a constant frequency preamble pattern 126A that is used to initialize gain settings, preset the timing loop to an approximate starting phase, and synchronize the SAMPLE CLOCK signal in preparation for sampling subsequent user data.

When the preamble pattern is first detected, RDGATE signal 156 changes state causing analog path enable signal 154 to go false and digital path enable signal 162 to go true. Upon entering timing acquisition mode, flash A/D 92 is sampling the incoming waveform at approximate sample locations. During timing acquisition mode, the timing loop comprises digital timing control 40, which includes a timing error extractor 166, a digital PLL loop filter 168, and an update rate scaler 170. The remainder of the loop includes timing DAC 104, summing junction 108, ICO 110, and flash A/D 92.

During the start of timing acquisition mode, raw data samples $X_K$ are conveyed from flash A/D 92 over path 130 to timing error extractor 166 and through a path diagrammatically indicated as a closed switch 172. However, FIR filter 36 may not yet be adapted to the particular data zone 70 from which user data is being read and, therefore, has a remaining processing delay that prevents phase lock of the timing loop. Accordingly, timing error extractor 166 generates sampling phase estimates $Z_K$ that can be used to approximately phase lock the loop until FIR filter 36 has adapted.

Sampling phase estimates $Z_K$ generated by timing error extractor 166 are conveyed through digital loop filter 168 and update rate scaler 170, which generates sample group error metric estimates $V_K$ at one half the ADCLK clock rate.

When enabled by enable signal 162, timing DAC 104 converts sample group error metric estimates $V_K$ to analog current values that are applied to summing junction 108. At the same time, the non-read mode reference value stored in analog loop filter 158 is applied to summing junction 108 as a static reference value for the particular data zone 70 being read. Accordingly, the error signal from timing DAC 104 acts as a fine adjustment to the static reference value, which causes ICO 110 to operate at the appropriately correct frequency when the timing loop is switched from non-read mode to read mode, thereby reducing the amount of ICO 110 adjustment required and, therefore, reducing the timing acquisition time.

The timing acquisition sub-mode has a duration that generally corresponds to the time interval during which data transducer head 26 is sensing constant frequency preamble field 126A. After this time interval, switch 172 opens, and a second switch 174 closes, thereby switching digital timing error extractor 166 from receiving raw samples generated by flash A/D 92 to receiving conditioned samples generated by FIR filter 36. Fast timing acquisition is beneficial because it allows reducing the physical length of servo preamble field 120A and, thereby, allows increasing the user data storage area.

Timing error extractor 166 preferably employs a lookup table technique that receives amplitude values of the ADCLK signal and the raw or conditioned samples from flash A/D 92 to rapidly and simply generate an arctangent function that quickly provides sampling phase estimates $Z_K$ of the phase angle between the samples and the ADCLK signal. Unlike prior lookup table techniques, the lookup table technique of this invention is insensitive to the gain of the sampled waveform, employs small tables, and requires no time-consuming and complex multiply or divide operations.

An understanding of the phase-estimating lookup table technique may be gained from the following description.

During timing acquisition, analog and digital control loops endeavor to adjust ICO 110 running at frequency $\omega_s$ to a frequency $\omega_i$, and a phase $\phi$ of the input signal to be sampled. The phase of the input signal is unknown whereas the frequency varies over a narrow range. Therefore, for purposes of phase acquisition, we can assume that $\omega_s=\omega_i$, and simply refer to them both as $\omega$. The control loop initially responds to $\sin(\omega t)$ and the input signal to $\sin(\omega+\phi)$. The phase $\phi$ of the input signal $\sin(\omega t+\phi)$ relative to a signal $\sin(\omega t)$ of the same frequency can be measured or estimated using a technique based on the trigonometric identity represented by:

$$\sin(a+b)=\sin(a)\cos(b)+\cos(a)\sin(b),$$

which can be rewritten as:

$$k^*\sin(\omega+\phi)=k^*\sin((\omega t)\cos\phi,$$

where k is an unknown gain applied to the input signal.

If $k^*\cos(\phi)$ and $k^*\sin(\phi)$ are expressed as (u) and (v), respectively, then:

$$k^*\sin(\omega t+\phi)=u^*\sin((\omega t)+u^*\cos(\omega t),$$

$v/u=k^*\sin(\phi)/k^*\cos(\phi)=\sin(\phi)/\cos(\phi)=\tan(\phi))$, and, therefore, $$\phi=\arctan(v/u)$$

Well known synchronous demodulation techniques may be employed to recover amplitude (u) of the sine component $\sin(\omega t)$ and amplitude (v) of the cosine component $\cos(\omega t)$. ICO 110 SAMPLE CLOCK is represented by $\sin((\omega t)$ and is used to sample the input signal four times per cycle at 0°, 90°, 180°, and 270° phase intervals. These samples be referred to as $X_{4n+0}$, $X_{4n+1}$, $X_{4n+2}$, and $X_{4n+3}$, respectively.

The relative amplitudes (u) and (v) of the sin and cosine components are recovered using the following expressions:

$$u = \sum_n X_{4n+1} - X_{4n+3}$$

$$v = \sum_n X_{4n+0} - X_{4n+2}$$

After amplitudes (u) and (v) are recovered over a chosen number of cycles n, the arctangent of (v/u) is used to derive the input signal phase $\phi$ relative to the SAMPLE CLOCK reference phase.

Figure 5:
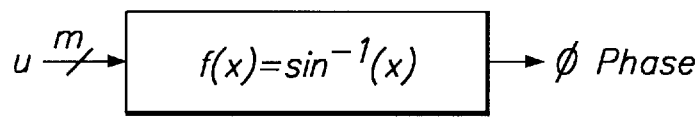
FIG. 5 is a functional block diagram representing a prior art arcsin lookup table phase estimating function.

The complexity of a straightforward calculation of arctan (v/u) has caused prior workers to use approximation techniques to simplify the required hardware. FIG. 5 shows a first prior art approach that assumes the input signal has a controlled gain, and looks up a phase value based on the amplitude of either the sine component (u) or the cosine component (v).

Figure 6:
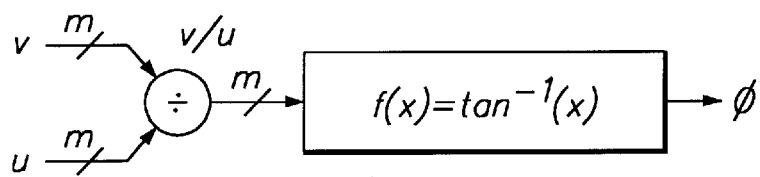
FIG. 6 is a functional block diagram representing a prior art division and arctan lookup table phase estimating function.

FIG. 6 shows a second prior art approach that is straightforward and employs a divide operation and an arctangent lookup table to provide a phase value.

Figure 7:
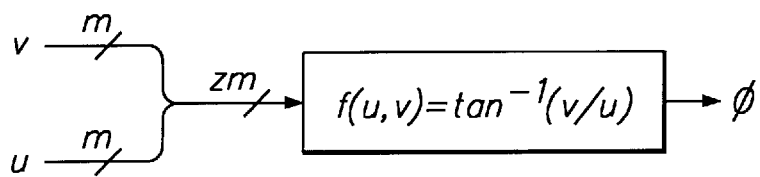
FIG. 7 is a functional block diagram representing a prior art arctan lookup table phase estimating function.

FIG. 7 shows a third prior art approach that employs a large lookup table to obtain the arctangent (v/u) directly from the (u) and (v) values.

Comparing the FIG. 5, 6, and 7 prior art approaches reveals that the FIG. 5 approach requires a lookup table having only $2^m$ entries, where m is the bit width of the input signal samples. However, the approach suffers from gain sensitivity, which is canceled in the arctangent approaches shown in FIGS. 6 and 7.

The FIG. 6 approach is gain insensitive, but requires a divide operation which is costly in both time and hardware.

The FIG. 7 approach provides a fast phase lookup, but has a two-dimensional input requiring a large lookup table having on the order of $2^{2m}$ entries.

Figure 8:
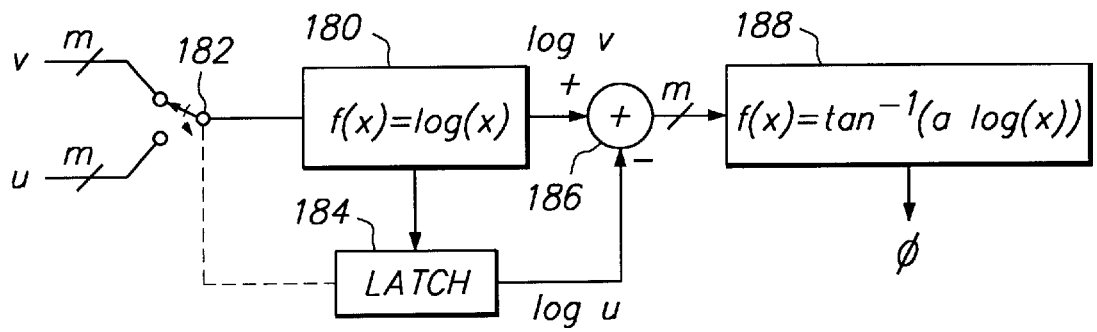
FIG. 8 is a functional block diagram representing a log lookup table function followed by an arctan/antilog lookup table phase estimating function of this invention.

FIG. 8 shows the phase estimating approach of this invention, which operates in accordance with the following equation:

$$\arctan(v/u)=\arctan(a\log(\log(v)-\log(u))).$$

The log function values are stored in a first lookup table 180 that is time-shared by a switching function 182 to provide both log(v) and log(u) values. A storage element 184 holds the log(u) value while switching function 182 routes magnitude v to first lookup table 180. The resulting log(v) value and the stored log(u) are combined in a subtraction function 186 that generates log(v)–log(u), which result addresses a second lookup table 188 that returns the addressed arctan(alog(log(v)–log(u))) value. Because the arctan and alog functions are cascaded, their combined values can be implemented in a single table. The only non-lookup operation required is the subtraction required to address second lookup table 188.

The phase estimating approach of this invention is advantageous because it is insensitive to gain, does not include a costly and time-consuming divide operation, and does not require an unduly large lookup table. Such an approach may be readily implemented in digital ASIC 17.

In addition to employing timing error extractor 166, another way of reducing the overall timing acquisition phase lock time is to momentarily halt ICO 110 and restart it in approximate phase synchronism with the incoming analog sinewave signal sensed during preamble field time by data transducer head 52.

Because servo preamble field 120A is reproduced as an approximate sinewave, there is a fixed time relationship between its zero crossings and the preferred sampling locations. Therefore, by detecting the zero crossing locations, timing may be determined for halting ICO 110 after the read gate signal RDGATE 156 goes true. One way of detecting zero crossings entails using a differential analog comparator 190, the inputs to which are differential complements of the analog signal presented at inputs 192 of flash A/D 92. Comparator 190 generates a digital waveform having approximately the same timing as the received servo preamble field 120A. In practice, however, comparator 190 and zero phase start logic array 164 introduce fixed logic delays that are lumped together and denoted by a fixed delay element 194. Because comparator 190 receives a plurality of frequencies adapted to radial data zones 70-1 through 70-9, fixed delay element 194 should ideally be programmable to a delay that is a function of the particular frequency. However, the programmable delay is more readily incorporated into the structure of ICO 110 and is denoted by a programmable delay element 196. Therefore, when fixed delay element 194 is summed with programmable delay element 196, the resultant delay achieves the desired phase relationship between the incoming analog signal and the SAMPLE CLOCK signal generated by ICO 110.

In operation, synthesizer 106 generates a nominal write clock during non-read times, and that clock controls ICO 110 via the above-described analog timing control circuit 100. When RDGATE signal 156 is asserted, ICO 110 is momentarily halted until comparator 190 goes false. Thereby the clock cycle is delayed by a fixed delay increment and a variable delay increment and signal samples are taken coincident (within a small error) with the rising edge of the phase-adjusted ADCLK signal. Following the zero phase start process, any remaining phase error is removed during the above-described timing acquisition mode.

Skilled workers will recognize that portions of this invention may be implemented differently from the implementation described above for a preferred embodiment. For example, the phase measuring method of this invention can be used in many applications requiring the angle between the sine and cosine components of a vector, such as rotary position resolver applications.

It will be obvious to those having skill in the art that many changes may be made to the details of the above-described embodiment of this invention without departing from the underlying principles thereof. The scope of this invention should, therefore, be determined only by the following claims.

What is claimed is:

1. In a data storage disk drive, a method of determining a phase angle between a phase angle between a clock signal and a data signal having a cosine component of amplitude (v) and sine component of amplitude (u) comprising:

storing a set of log(u) and log(v) values in a first lookup table;

storing a set of arctan(log(v)–log(u)) values in at least a second lookup table;

looking up a log(u) value in the first lookup table;

storing the log(u) value;

looking up a log(v) value;

subtracting the stored log(u) value from the log(v) value to form an intermediate result;

addressing the second lookup table with the intermediate result to return a result including an arctan(v/u) value; and determining the phase angle from the arctan(v/u) value.

2. The method of claim 1 in which the log(u) and log(v) values include a shared set of values and the looking up steps further include switching the first lookup table between the amplitude(u) and the amplitude (v).

3. The method of claim 1 in which the data signal is derived from a data transducer head read signal in the data storage disk drive and the clock signal is derived from a signal that controls sampling of the data signal.

4. The method of claim 1 in which the arctan and log(v)–log(u) values are stored in a single lookup table.

5. The method of claim 1 in which the first and second lookup tables are included in a single lookup table.

6. The method of claim 1 in which the data and clock signals include respective sine and cosine components of a vector produced by a rotary position resolver.

7. The apparatus of claim 1 in which the first and second lookup tables are included in a single lookup table.

8. Data storage disk drive apparatus for controlling a sampling clock having a sampling frequency and a sampling phase relative to a data signal having a data frequency and a data phase, comprising:

an analog timing controller adjusting the sampling frequency during a first time period;

a digital timing controller adjusting the sampling phase during a second time period; and a timing error extractor determining the sampling phase relative to the data phase during a time interval spanning a transition from the first time period to the second time period, the timing error extractor coacting with the digital timing controller to adjust the sampling phase to a predetermined angle relative to the data phase, the data signal having a cosine component of amplitude (v) and a sine component of amplitude (u), the timing error extractor comprising:

a first lookup table storing a set of log(u) and log(v) values;

at least a second lookup table storing a set of arctan (log(v)–log(u)) values;

means for looking up a log(u) value in the first lookup table;

a memory storing the log(u) value;

means for looking up a log(v) value;

a subtraction function subtracting the stored log(u) value from the log(v) value to form an intermediate result; and addressing means addressing the second lookup table with the intermediate result to return an arctan(v/u) value for determining the sampling phase relative to the data phase.

9. The apparatus of claim 8 in which the sampling frequency and the data frequency are substantially equal and the predetermined angle is about zero degrees.

10. The apparatus of claim 8 in which the data signal is derived from a data transducer head read signal in the data storage disk drive and the sampling clock is derived from the sampling clock that controls a sample timing of the data signal.

11. The apparatus of claim 7 in which the log(u) and log(v) values include a shared set of values stored in the first lookup table.

12. The apparatus of claim 11 further including switching means for switching the first lookup table between the amplitude (u) and the amplitude (v).

13. The apparatus of claim 7 in which the arctan and log(v)–log(u) values are stored in a single lookup table.

* * * * *

UNITED STATES PATENT AND TRADEMARK OFFICE
CERTIFICATE OF CORRECTION

PATENT NO.    : 6,191,906 B1
DATED         : February 20, 2001
INVENTOR(S)   : Buch It is certified that error appears in the above-identified patent and that said Letters Patent is hereby corrected as shown below:

<u>Column 12,</u>
Line 39, replace "7" with -- 8 --.
Line 45, replace "7" with -- 8 --.

Signed and Sealed this

Twenty-third Day of April, 2002

Attest:

Attesting Officer

JAMES E. ROGAN
*Director of the United States Patent and Trademark Office*